(12) United States Patent
Hassan

(10) Patent No.: US 8,729,726 B2
(45) Date of Patent: May 20, 2014

(54) PETROLEUM-ALTERNATIVE POWER PLANT

(71) Applicant: M. Hassan Hassan, Windermere, FL (US)

(72) Inventor: M. Hassan Hassan, Windermere, FL (US)

( * ) Notice: Subject to any disclaimer, the term of this patent is extended or adjusted under 35 U.S.C. 154(b) by 19 days.

(21) Appl. No.: 13/651,364

(22) Filed: Oct. 12, 2012

(65) Prior Publication Data

US 2014/0103663 A1 Apr. 17, 2014

(51) Int. Cl.
*F03D 9/00* (2006.01)
(52) U.S. Cl.
USPC .......................................................... 290/55
(58) Field of Classification Search
USPC ..................................... 290/55, 44
See application file for complete search history.

(56) References Cited

U.S. PATENT DOCUMENTS

| | | | |
|---|---|---|---|
| 3,930,750 A | 1/1976 | Schultz | |
| 4,119,863 A | 10/1978 | Kelly | |
| 4,323,331 A | 4/1982 | Schachle et al. | |
| 4,398,096 A | 8/1983 | Faurholtz | |
| 4,411,588 A | 10/1983 | Currah, Jr. | |
| 5,982,046 A | 11/1999 | Minh | |
| 6,215,199 B1 | 4/2001 | Lysenko et al. | |
| 6,582,291 B2 | 6/2003 | Clark | |
| 6,766,643 B2 | 7/2004 | Christensen | |
| 7,084,520 B2 | 8/2006 | Zambrano et al. | |
| 7,276,809 B2 | 10/2007 | Zambrano et al. | |
| 7,315,093 B2 | 1/2008 | Graham, Sr. | |
| 7,918,650 B2 | 4/2011 | Papp | |
| 7,964,978 B1 | 6/2011 | Weissmann | |
| 8,197,178 B1 | 6/2012 | Chen | |
| 8,210,792 B2 | 7/2012 | Suma | |
| 8,257,020 B2 | 9/2012 | Graham, Sr. | |
| 8,258,646 B2 | 9/2012 | Oosterling | |
| 8,552,580 B2 * | 10/2013 | Tackett | 290/55 |

* cited by examiner

*Primary Examiner* — Michael Zarroli

(57) ABSTRACT

The present disclosure includes a petroleum-alternative power plant system harvesting wind, solar, and thermal energies. The system may include at least one two-wind-turbine power tower building where the outside surface of the building is divided into a number of sections. Each section forms a funnel-shaped duct to guide and accelerate the wind streams toward the vanes of the first wind turbine; then wind streams accelerated further and guided toward the vanes of a second wind turbine. The system may also include solar receptors, solar tower, and thermal receptors to harvest more energy. A management control subsystem is provided to combine electricity, and selectively delivering electricity to any electric load, a non-fossil fuel production subsystem, and the power grid.

12 Claims, 9 Drawing Sheets

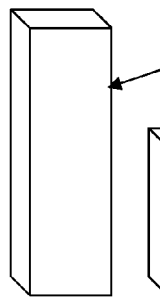
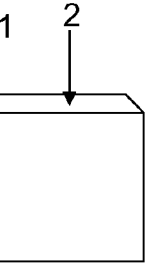
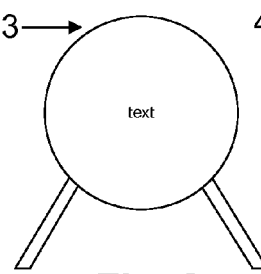
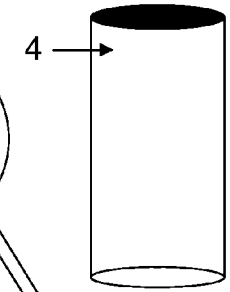
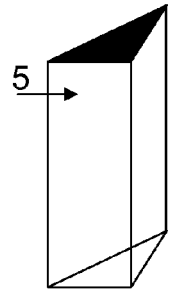
Fig. 1  Fig. 2  Fig. 3  Fig. 4  Fig. 5
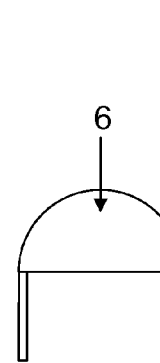
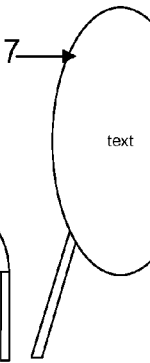
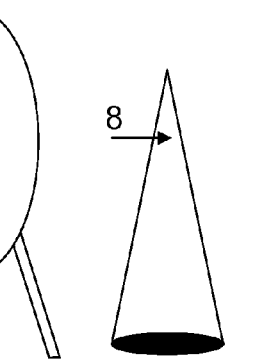
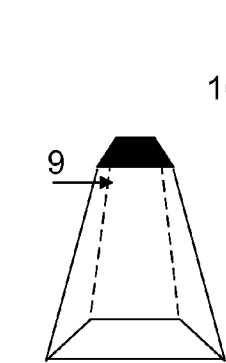
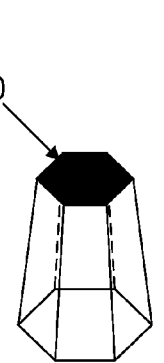
Fig. 6  Fig. 7  Fig. 8  Fig. 9  Fig. 10
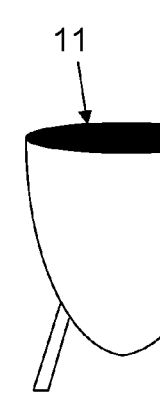
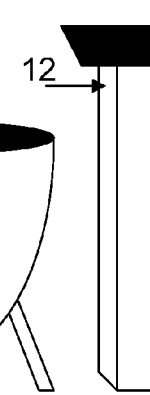
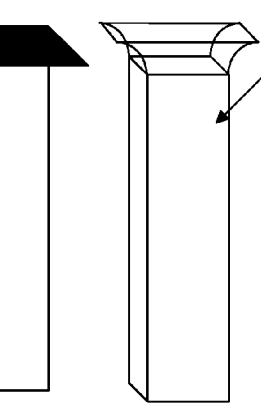
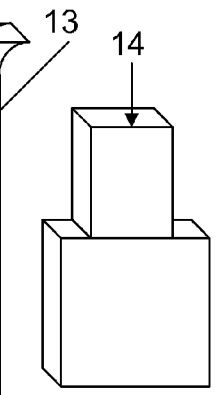
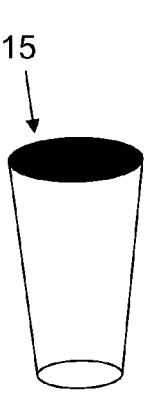
Fig. 11  Fig. 12  Fig. 13  Fig. 14  Fig. 15

PETROLEUM-ALTERNATIVE POWER PLANT

CROSS REFERENCE TO RELATED APPLICATION

Not Applicable

STATEMENT REGARDING FEDERALLY SPONSORED RESEARCH OR DEVELOPMENT

Not Applicable

FIELD OF THE INVENTION

The present invention relates generally to power plants and more specifically to petroleum-alternative power plants and non-fossil fuel production system harvesting wind, solar, and thermal energies.

BACKGROUND OF THE INVENTION

Growing global energy demands put pressure on both the supply and the prices of oil, gas, and coal. As fossil energy sources today are an important part of maintaining a stable energy network in the world, it is crucial to use these resources in a sustainable and high efficiency manner. Even with the increased efficiency in both production and use of fossil fuel, the gradual depletion and the ultimate exhaustion of fossil fuel is an undisputable reality. Therefore, innovations in all areas of sustainable energy supply and energy consumption are among the most effective tools we have to fight the negative consequences of climate change and the dependency on fossil fuel. On the other hand, using non-fossil fuel and petroleum-alternative resources, such as hydrogen or rechargeable batteries, are becoming more and more necessary to provide intelligent climate solutions, ecological benefits as well as economical advantages. Therefore, the current disclosure for petroleum-alternative power plant and non-fossil fuel production is vital for its ecological and economical impacts. The present invention of petroleum-alternative power plant and non-fossil fuel production is based on harvesting wind, solar, and thermal energies in highly efficient and practical manner. Hence, the current disclosure aims to construct power plants with wide range of power outputs from low to very high output depending on the power plant size and design to satisfy many customers depending on their power needs. The production of non-fossil fuel such as hydrogen to replace fossil fuel in many applications is a vital component of this invention.

DESCRIPTION OF THE PRIOR ART

Recently, an increase in demand for alternative energy has enhanced interest in wind, solar, and thermal energies. The desire to capture the wind, solar, and thermal energies to provide power is not new; however, the methods and apparatus to perform the capture have evolved only slowly and often inefficiently over a long period of time.

In the prior art (U.S. Pat. Nos. 3,930,750; 4,323,331; 6,766,643; 7,964,978; 8,258,646), conventional wind power plants typically face fierce resistance by neighbors, intellectuals, and government officials who not unreasonably cite many problems that can be summarized as follows:

First, they require two or three very long blades that must be placed very high into the air so as to be positioned in a relatively smoothly flowing air current and they must also be mounted high enough so that the whirling blades do not strike the ground, trees, buildings, wires, and the like.

Second, when it comes to wildlife windmills provide danger to birds and animals alike. Birds can fly into one blade and animals can climb to the windmill equipment. Therefore, windmills may cause danger to wildlife, impact on the environment, and may demand high cost of maintenance continuously.

Third, due to the great length of the blades and height of the mounting structures, the mounting towers can be enormous and require stabilizing wires anchored hundreds of feet from the mounting tower, hence, occupying a huge amount of real estate.

Fourth, the spinning blades can create unpleasant and disruptive noise and vibration which somewhat can be unbearable for residential or even commercial neighborhoods.

Fifth, the aesthetic qualities of the technology are poor since the windmills are quite big, and they do create somewhat of a blot on the landscape.

Sixth, current windmills are exposed to the destructive power of nature, such as storms, hurricanes, tornadoes, that can easily damage the windmill's components and may cause significant loss to life and property.

Seventh, windmills must point to the wind to achieve a high efficiency of conversion to electricity. Often, horizontal axis wind turbines (HAWT) are equipped with a yaw mechanism to face the blade rotor into veering wind directions; while, vertical axis wind turbines (VAWT) do no have orientation parts to maintain. Nevertheless, since wind flow within urban and suburban environments is turbulent and veering. Increased turbulence levels yield greater fluctuations in wind speed and direction continuously, hence, reducing the efficiency of the turbine due to opposing winds or the frequent change in wind directions.

Eighth, the maximum efficiency of a wind turbine depends on the design of the wind turbine, the type of its blades, its rotational speed, the tip speed ratio, and the undisturbed, continuous flow of wind stream. Having disturbed wind or veering wind directions will reduce the turbine efficiency significantly.

Ninth, one may observe by visiting a wind field that the blades of one or more turbines are rotating and the others are not moving at all. This may occur due to the fact that the minimum threshold of wind speed required for the turbine to operate is not met. In other words, simply many turbines will not generate power at low wind speed conditions. Additionally, veering wind directions may work against each other to prevent the turbine blades from rotating.

Tenth, when windmills are exposed to sun and rain, snow and sleet, storms and other elements, they are more likely to rust and break up gradually. Therefore, they often require high maintenance or frequent replacements to very expensive windmill equipment and parts.

To solve the problem of noise, vibration, and other problems cited above, some prior arts (U.S. Pat. Nos. 4,119,863; 4,398,096; 6,582,291; 7,084,520; 7,276,809; 7,315,093; 8,210,792; 8,257,020) suggested placing windmills on the roof of a dwelling or an occupied building. Wrongly thinking that this approach will solve the problems of noise, vibration, and other problems cited above. Placing windmills on the tops of houses and occupied buildings is not only impractical, inefficient, and noisy; it may be also dangerous to life and property due to the heavy weight of the windmill equipment that often a house structure cannot support. Nevertheless, the amount of the generated electricity is insignificant in comparison to the cost of windmill equipment and the structural changes in a dwelling or an occupied building.

To solve the problem of low wind speed, some prior arts (U.S. Pat. Nos. 4,411,588; 5,982,046; 6,215,199; 7,918,650; 8,197,178) proposed venturi-like ducts to increase the speed of the wind stream. Although, these prior art's systems and methods fulfill their respective, particular objectives and requirements, they do not disclose the structure of the invention of the applicant for a new reliable, high-efficiency power plant that harnesses wind streams from any compass direction where all wind streams work jointly and cooperatively despite veering and turbulent environments; in addition to harnessing solar and thermal energies to generate the maximum power and to produce non-fossil fuel, if required.

Presently, no known high-power, high-efficiency, environmentally and wildlife friendly, safe and low maintenance, petroleum-alternative power plant and non-fossil fuel production system exist that provide usable electrical output and non-fossil fuel with ordinary and variable wind flow arriving from any compass direction, and with harnessing solar and thermal energies, while being visually pleasing, substantially inaudible and vibration free, as well as protected from the elements.

SUMMARY OF THE INVENTION

The present invention provides a high-efficiency power plant method and system for harvesting wind energy from ordinary wind flow arriving from any compass direction, while being visually pleasing, inaudible, and protected from the elements. The system may also include subsystems to harvest solar and thermal energies.

The system in its simplest form may include a power tower represented by a building structure used exclusively for the purpose of generating electricity and producing non-fossil fuel(s). The building structure has an outside surface, top, bottom, a hollow center, and two rooms; the first room is at the bottom of the building structure and the second room at the top of the building structure. The building structure is a rectangular building, a trapezoidal building, a cubical building, a spherical building, a cylindrical building, a polygonal building, a triangular building, a semispherical building, a building with extended roof, a building with wind huggers, or an irregular shape building. The power plant system can be one building, or a plurality of buildings with the same architectural design, or a plurality of buildings with any combination of architectural design.

To increase the overall efficiency of the system, two wind turbines are used in every power tower; first wind turbine is placed at the first room with its blades are provided at the hollow center of the power tower; and the second wind turbine is provided at the second room with its blades are directly exposed to the wind stream coming from the hollow center of the building structure. The wind turbine placed at the center of the power tower is a vertical axis with Savonius, helical, multi-vanes, or Darrieus type blades. The wind turbine placed on the roof of the power tower has a horizontal axis with Savonius, helical, multi-vanes, or Darrieus type blades.

The outside surface of the building structure is divided into a number of sections. Each section forms a funnel-shaped horizontal duct to guide the winds to the blades of the first wind turbine wherein the cross-sectional area at the building structure surface is larger than the cross-sectional area at the blades of the first wind turbine. This would increase the speed of the applied wind by a factor of R, where R equals to the ratio of the cross-sectional area of the duct at the building structure surface to the cross-sectional area of the duct at the blades of the first turbine. Every funnel-shaped horizontal duct is provided with a valve and a control subsystem to prevent winds flowing in the opposite direction from the hollow center to the outside surface of the building structure and to control and direct all winds to the blades of the first wind turbine for optimal efficiency. All wind streams from all compass directions are applied to the blades of the first wind turbine where wind energy is converted to electricity.

There is a barrier preventing wind streams from flowing downward in the hollow center from the first wind turbine to the first room of the building structure; therefore the wind stream flows upward in the hollow center towards the blades of the second wind turbine. The hollow center forms a funnel-shaped vertical duct from a point above the blades of the first wind turbine to a point at or just below the blades of the second wind turbine to accelerate the wind stream further. The funnel-shaped vertical duct is provided with a valve and a control subsystem to prevent winds flowing downward in the hollow center of the building structure and to control and direct wind flow to the blades of the second wind turbine for optimal efficiency. The wind stream in the funnel-shaped vertical duct is applied to the blades of the second wind turbine where wind energy is converted to electricity. The management control subsystem combines electricity from the first wind turbine and said second wind turbine, and selectively delivering electricity to a power grid and an electric load. The electric load is a house, a subdivision, a commercial unit, an industrial plant, or any other entity that requires electricity.

The power plant system may include a non-fossil fuel production unit(s); wherein said management control subsystem selectively delivers electricity to the non-fossil fuel production unit(s), the power grid, and the electric load; wherein the non-fossil fuel production unit(s) includes a plurality of at least one of hydrogen production subsystem, compressed air production subsystem, liquid nitrogen production subsystem, rechargeable batteries subsystem, and ammonia production subsystem.

In an alternative embodiment, the power plant system may include a solar receptor subsystem; wherein the solar receptor subsystem converts solar power to electricity using solar receptors, the solar receptors are located on the top portion of the building structure; wherein said solar receptor subsystem includes a plurality of at least one of photovoltaic cells, concentrated photovoltaic cells, dye solar cells, concentrated dye solar cells, thin-film solar cells, concentrated thin-film cells, three-layer photovoltaic cells, concentrated three-layer photovoltaic cells, luminescent photovoltaic cells, concentrated luminescent photovoltaic cells, polymer photovoltaic cells, concentrated polymer photovoltaic cells, hybrid solar cells, and concentrated hybrid solar cells; and wherein said management control subsystem combines electricity from said first wind turbine, said second wind turbine and said solar receptor subsystem, and selectively delivering electricity to said power grid and said electric load.

In another embodiment, the system may include a solar power tower provided at the center of the top portion of said building structure; a liquid furnace placed on said solar tower; a plurality of sun-light tracking devices, such as heliostats or solid-state sun tracker, provided at the top portion of said building structure to focus the sun's ray upon said liquid furnace, and a steam-driven turbine to convert steam energy to electricity; wherein said liquid furnace converts water to steam and said steam drives the said steam-driven turbine to generate electricity; and wherein said management control subsystem combines electricity from said first wind turbine, said second wind turbine and said steam-driven turbine, and selectively delivering electricity to said power grid and said electric load.

In yet another embodiment, the system may include thermal receptor subsystem; wherein said thermal receptor subsystem converts thermal power to electricity using thermal receptors, said thermal receptors acting as a heat sink are mounted on at least one of the said top portion of said building structure; said bottom portion, said outside surface, and the said room; wherein said thermal receptors includes a plurality of at least one of thermoelectric cells, concentrated thermoelectric cells, thermophotovoltaic cells, and concentrated thermophotovoltaic cells; and wherein said management control subsystem combines electricity from said first wind turbine, said second wind turbine, said thermal receptor subsystem, and selectively delivering electricity to said power grid and said electric load.

BRIEF DESCRIPTION OF THE DRAWINGS

These and other features, aspects, and advantages of the present invention may be more fully understood when the following detailed description is read with reference to the accompanying drawings, where the components are not necessarily to scale, and in which corresponding reference numerals designate corresponding parts throughout the drawings, wherein:

FIG. 1 illustrates a power tower using a rectangular building structure;

FIG. 2 illustrates a power tower using a cubical building structure;

FIG. 3 illustrates a power tower using a spherical building structure;

FIG. 4 illustrates a power tower using a cylindrical building structure;

FIG. 5 illustrates a power tower using a triangular building structure;

FIG. 6 illustrates a power tower using a semispherical building structure;

FIG. 7 illustrates a power tower using an oval building structure;

FIG. 8 illustrates a power tower using a cone building structure;

FIG. 9 illustrates a power tower using a trapezoidal building structure;

FIG. 10 illustrates a power tower using a polygonal building structure;

FIG. 11 illustrates a power tower using a semi-oval building structure;

FIG. 12 illustrates a power tower using a building structure with an extended roof;

FIG. 13 illustrates a power tower using a building structure with wind huggers;

FIG. 14 illustrates a power tower using an irregular shape building structure;

FIG. 15 illustrates a power tower using a semi-oval building structure;

DETAILED DESCRIPTION OF THE INVENTION

Figure 16:
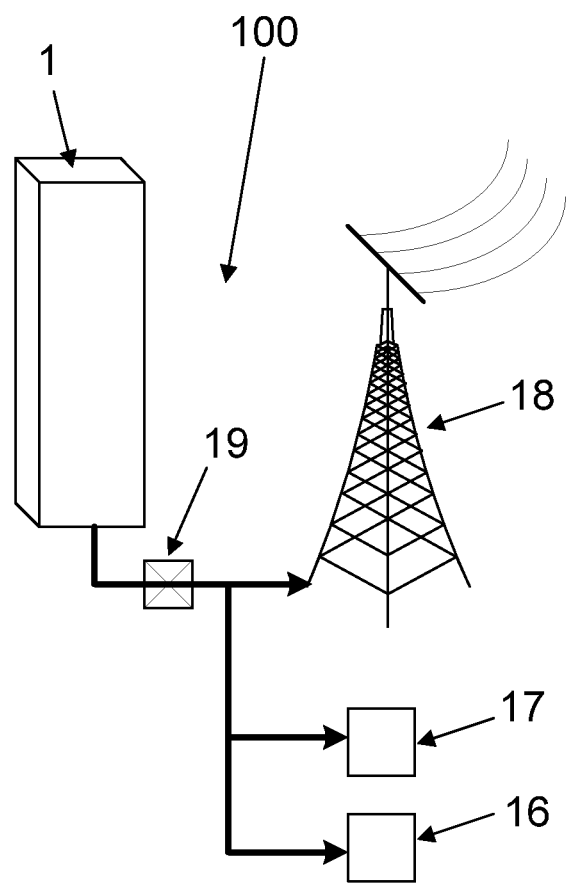
FIG. 16 illustrates a power plant using one power tower.

The detailed description set forth below is intended as description of the presently preferred embodiments of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are intended to be encompassed within the scope of the invention.

With reference now to the drawings in given FIGS. 1-23, the preferred embodiments will now be described in detail. A petroleum-alternative power plant and non-fossil fuel production system in accordance with the present invention is designated generally as "100". The power plant 100 consists of a plurality of power towers. FIGS. 1-15 illustrate several power towers using several building structures, namely: a rectangular building structure 1; a cubical building structure 2; a spherical building structure 3; a cylindrical building structure 4; a triangular building structure 5; a semispherical building structure 6; an oval building structure 7; a cone building structure 8; a trapezoidal building structure 9; a polygonal building structure 10; a semi-oval building structure 11; a building structure with an extended roof 12; a building structure with wind huggers 13; an irregular shape building structure 14; and a semi-oval building structure 15.

FIG. 16 illustrates a power plant system 100 that consists of one power tower using a rectangular building structure 1. The electricity generated from the power plant 100 is used to supply power to an electric load 16, a non-fossil fuel production unit 17; and/or the power grid 18. The management and control subsystem 19 selectively delivers electricity to the electric load 16, the non-fossil fuel production subsystem 17, and the power grid 18. The management and control subsystem 19 can be placed inside the power tower 1 or in a separate utility room outside the power plant system 100 as shown in FIG. 16. The electric load comprises a plurality of at least one of residential buildings, commercial buildings, industrial buildings, and any load, apparatus or device that needs electricity. Additionally, the non-fossil fuel production unit comprises a plurality of at least one of hydrogen production subsystem, compressed air production subsystem, liquid nitrogen production subsystem, rechargeable batteries subsystem, and ammonia production subsystem.

Figure 17:
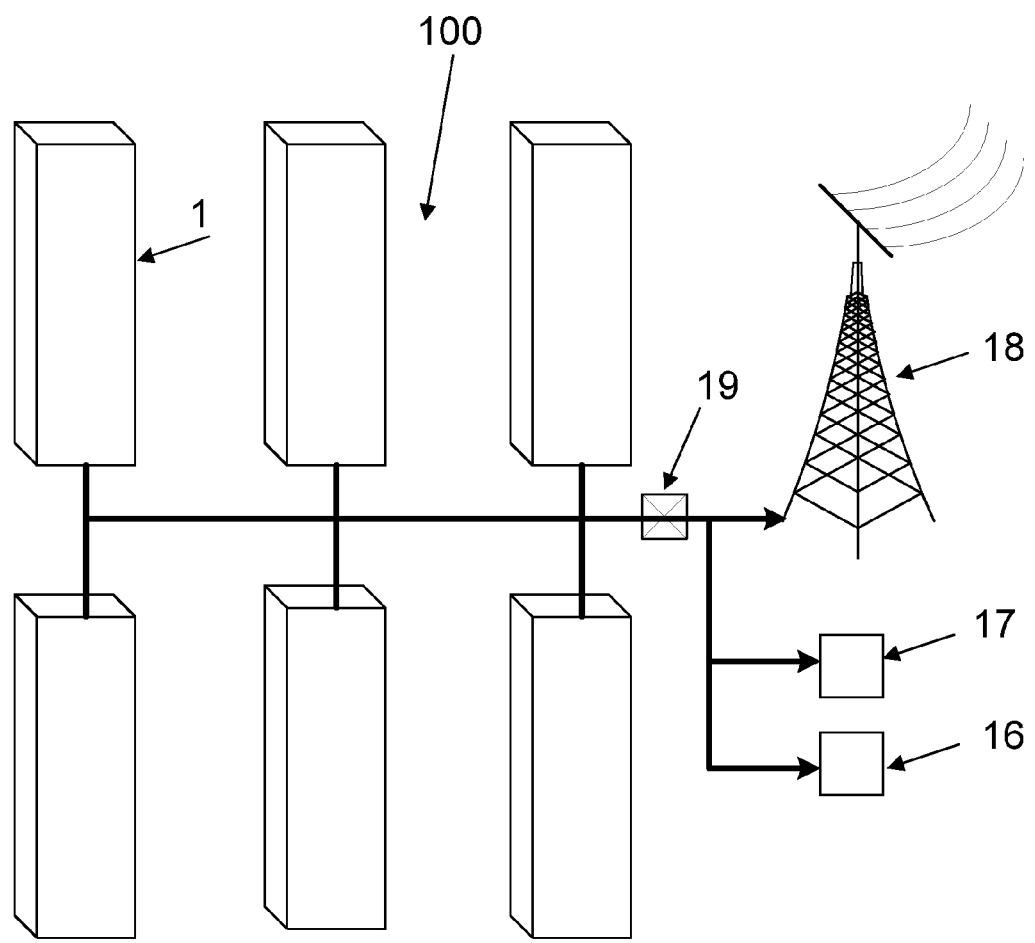
FIG. 17 illustrates a power plant using a plurality of power towers with the same building structure.

FIG. 17 illustrates a power plant system 100 that consists of a plurality of power towers where each power tower using the same rectangular building structure 1. The electricity generated from the power plant 100 is used to supply power to an electric load 16; a non-fossil fuel production subsystem 17; and/or the power grid 18. The management and control subsystem 19 selectively delivers electricity to the electric load 16, the non-fossil fuel production subsystem 17, and the power grid 18. The management and control subsystem 19 can be placed inside the power tower 1 or as a separate utility room outside the power plant system 100 as shown in FIG. 17.

The electric load comprises a plurality of at least one of residential buildings, commercial buildings, industrial buildings, and any load, apparatus or device that needs electricity. Additionally, the non-fossil fuel production unit comprises a plurality of at least one of hydrogen production subsystem, compressed air production subsystem, liquid nitrogen production subsystem, rechargeable batteries subsystem, and ammonia production subsystem.

Figure 18:
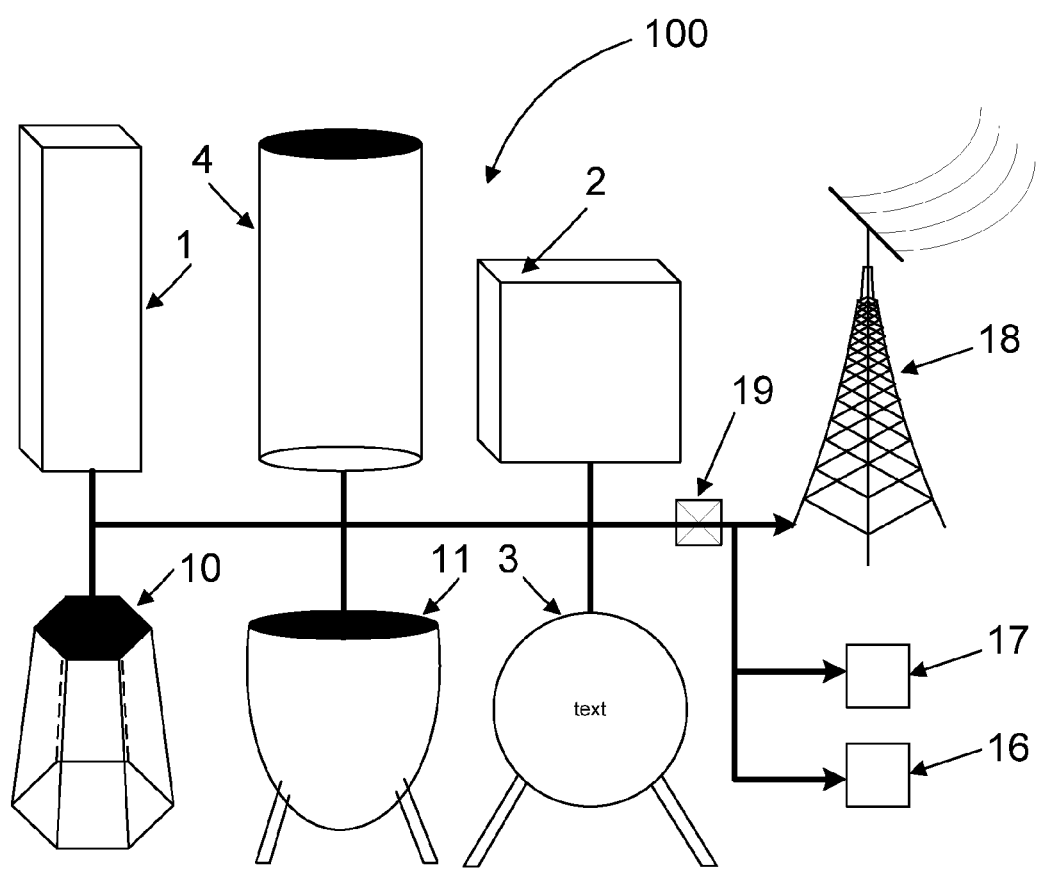
FIG. 18 illustrates a power plant using a plurality of power towers with mixed building structures.

FIG. 18 illustrates a power plant system 100 comprises a plurality of power towers using the mixed building structures 1, 2, 3, 4, 10, and 11. The electricity generated from the power plant 100 is used to supply power to an electric load 16, a non-fossil fuel production subsystem 17, and/or the power grid 18. The management and control subsystem 19 selectively delivers electricity to the electric load 16, the non-fossil fuel production subsystem 17, and the power grid 18. The management and control subsystem 19 can be placed inside a power tower or in a separate utility room outside the power plant system 100 as shown in FIG. 18. The electric load comprises a plurality of at least one of residential buildings, commercial buildings, industrial buildings, and any load, apparatus or device that needs electricity. Additionally, the non-fossil fuel production unit comprises a plurality of at least one of hydrogen production subsystem, compressed air production subsystem, liquid nitrogen production subsystem, rechargeable batteries subsystem, and ammonia production subsystem.

Figure 19:
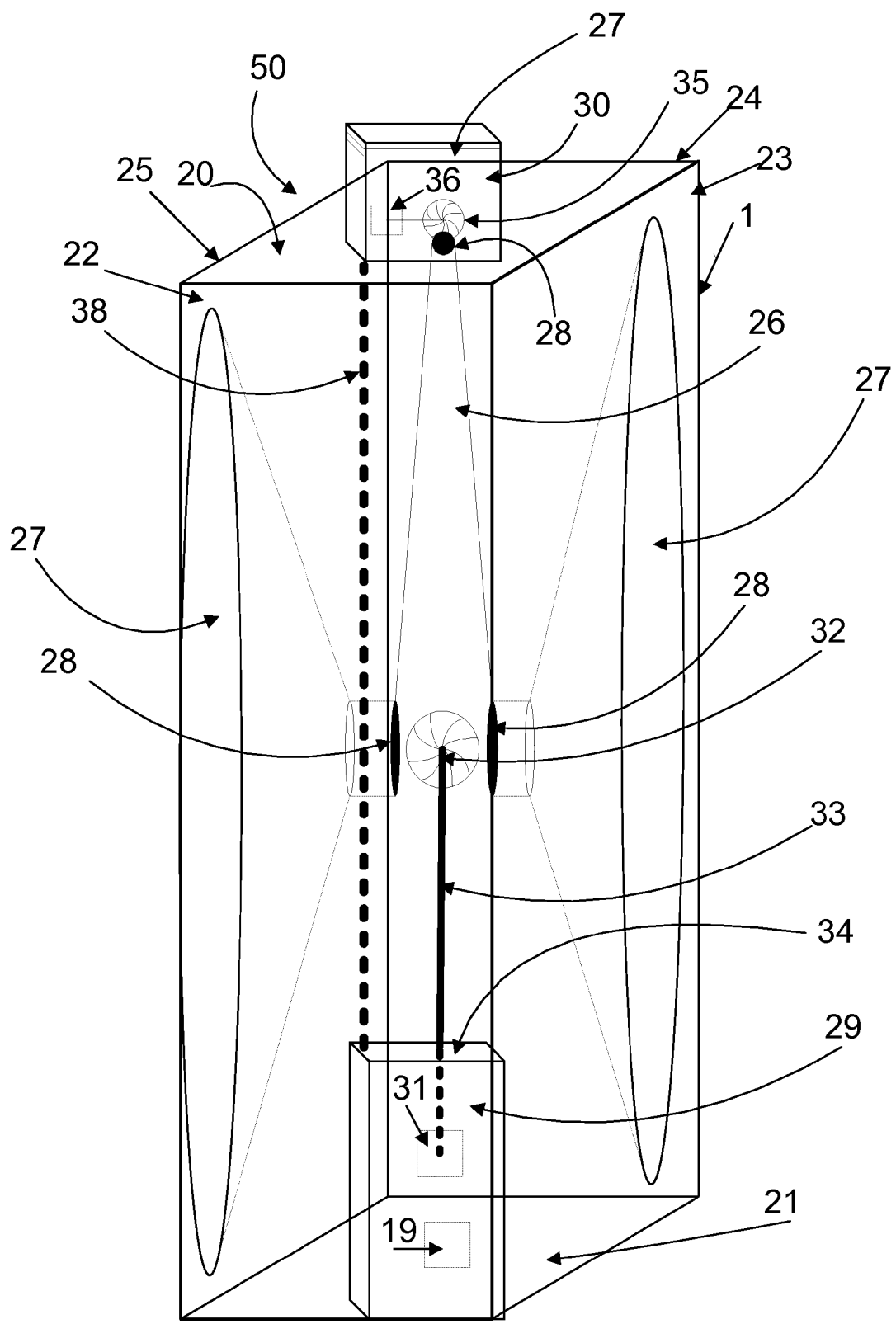
FIG. 19 shows a power tower system illustrating the invention in its simplest form, in accordance with one embodiment of the invention.

FIG. 19 shows a power tower system 50 illustrating the invention in its simplest form, in accordance with one embodiment of the invention. The power tower 50 comprises a top portion 20, a bottom portion 21, four sides 22, 23, 24, and 25, and a hollow portion 26 connecting the center of the top portion 20 to the center of the bottom portion 21. Each side represents a section forming a horizontal funnel-shaped duct 27 to guide and accelerate the wind from the power tower surfaces 22, 23, 24, and 25 to the hollow portion of the building 26 where the cross-sectional area at the power tower surface is the largest and it covers all or most of the section's area. The cross-section area of the funnel-shaped duct can have elliptical, circular, polygonal, rectangular, or irregular profile. The end of the horizontal funnel-shaped duct is provided with a valve and control subsystem 28 to prevent air flowing backward from the hollow portion 26 to the outside surface of the power tower 50 and to control system efficiency. Only two out of four funnel-shaped ducts are shown in FIG. 19. There are two rooms in the power tower 50—the first room 29 is placed at the center of the bottom portion 21 and the second room 30 is placed at the center of the top portion 20. The first wind turbine 31 is placed in the first room 29 and connected to its vanes 32 via its shaft 33. The ceiling 34 of the first room 29 acts as a barrier to prevent winds from flowing downward. At a point just above the vanes 32 of the first wind turbine 31 the hollow portion 26 forms a vertical funnel-shaped duct to guide and accelerate the winds upward to the vanes 35 of the second wind turbine 36 which is placed in the second room 30. The end of the vertical funnel-shaped duct is provided with a valve and control subsystem 28 to prevent air flowing backward and to control system efficiency. The second room 30 is provided with vents 37 to allow winds to exist the power tower 50. The power tower system 50 operates by collecting, guiding and accelerating winds from any compass direction and targeting all wind streams efficiently to the vanes 32 of the first wind turbine 31 to convert wind energy to electricity than the wind stream is accelerated further and guided upward through a vertical funnel-shaped duct 26 to target the vanes 35 of the second wind turbine 36 to convert the remaining wind energy to electricity. Energy generated at the top portion 20 of the power tower 50 is transferred via cables, wires and pipes to the bottom portion 21, where such cables, wires, and pipes are provided through the channel 38. The management and control subsystem 19 selectively delivers electricity to the electric load 16, the non-fossil fuel production subsystem 17, and the power grid 18. The first wind turbine 31 placed at the center of the power tower is a vertical axis with Savonius, helical, multi-vanes, or Darrieus type blades. The second wind turbine 36 placed on the roof of the power tower 20 has a horizontal axis with Savonius, helical, multi-vanes, or Darrieus type blades.

Figure 20:
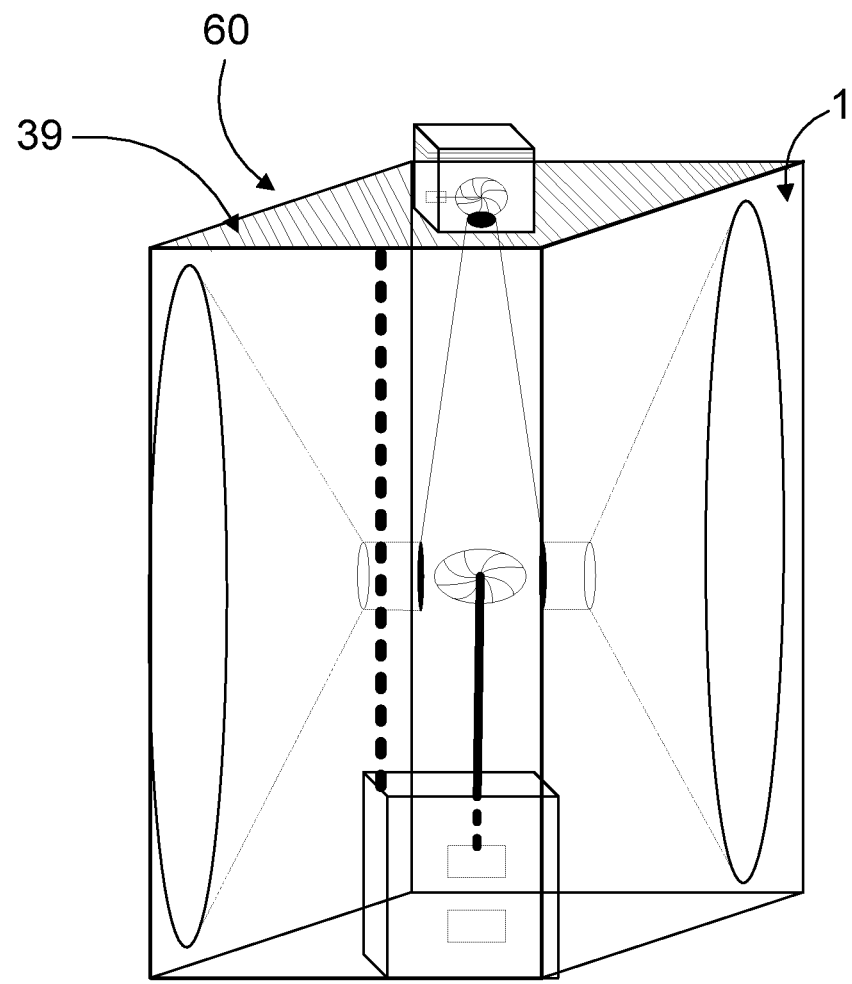
FIG. 20 shows a power tower system illustrating the invention in its simplest form, in accordance with another embodiment of the invention.

FIG. 20 shows a two wind turbine and solar receptor power tower system 60 illustrating the invention in its simplest form, in accordance with another embodiment of the invention. The power tower 60 utilizes a polarity of solar receptors 39 to convert solar energy to electricity. The solar receptor subsystem 39 includes a plurality of at least one of photovoltaic cells, concentrated photovoltaic cells, dye solar cells, concentrated dye solar cells, thin-film solar cells, concentrated thin-film cells, three-layer photovoltaic cells, concentrated three-layer photovoltaic cells, luminescent photovoltaic cells, concentrated luminescent photovoltaic cells, polymer photovoltaic cells, concentrated polymer photovoltaic cells, hybrid solar cells, and concentrated hybrid solar cells. The management control subsystem 19 combines electricity from the first wind turbine 31, the second wind turbine 36 and the solar receptor subsystem 39, and selectively delivering electricity to an electric load 16, a non-fossil fuel production subsystem 17; and/or the power grid 18.

Figure 21:
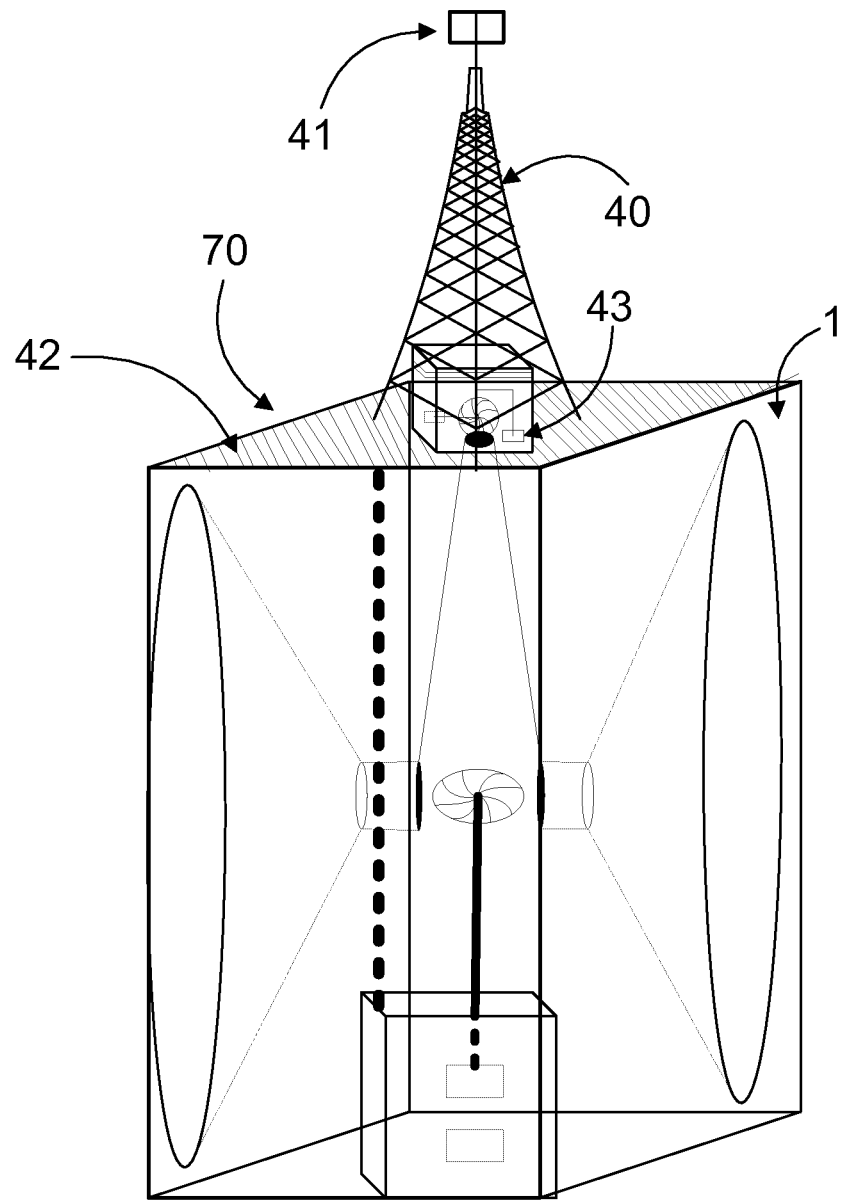
FIG. 21 shows a power tower system illustrating the invention in its simplest form, in accordance with another embodiment of the invention.

FIG. 21 shows a solar tower and two wind turbine power tower system 70 illustrating the invention in its simplest form, in accordance with another embodiment of the invention. The power tower 70 utilizes a solar power tower 40 provided at the center of the top portion of said building structure 1; a liquid furnace 41 placed on said solar tower; a plurality of sunlight tracking devices 42, such as heliostats or solid-state sun tracker, provided at the top portion of said building structure to focus the sun's ray upon said liquid furnace, and a steam-driven turbine 43 to convert steam energy to electricity; wherein the liquid furnace converts water to steam and said steam drives the steam-driven turbine 43 to generate electricity. The management control subsystem 19 combines electricity from the first wind turbine 31, the second wind turbine 36 and the steam-driven turbine 43, and selectively delivering electricity to an electric load 16, a non-fossil fuel production subsystem 17; and/or the power grid 18.

Figure 22:
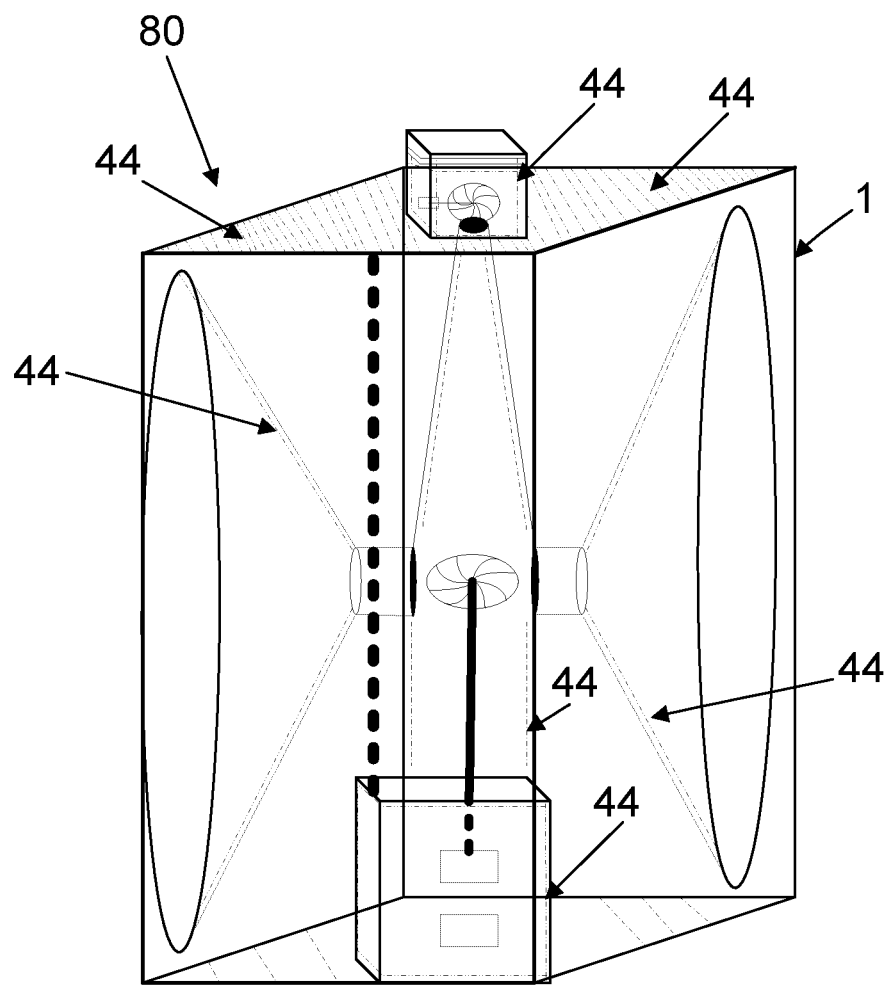
FIG. 22 shows a power tower system illustrating the invention in its simplest form, in accordance with another embodiment of the invention.

FIG. 22 shows a two wind turbine and thermal receptors power tower system 80 illustrating the invention in its simplest form, in accordance with another embodiment of the invention. The power tower 80 utilizes thermal receptor subsystem 44 to convert thermal energy to electricity in addition to the first wind turbine 31 and the second wind turbine 36. The thermal receptors subsystem 44 are placed on any possible surface including the top portion 20 and the bottom portion 21 of the building structure 1, inside the first room 29 and the second room 30 and around the horizontal funnel-shaped ducts 27 and the vertical funnel-shaped duct 26 to harness thermal energy. Wherein the thermal receptors subsystem 44 includes a plurality of at least one of thermoelectric cells, concentrated thermoelectric cells, thermophotovoltaic cells, and concentrated thermophotovoltaic cells. The management control subsystem 19 combines electricity from the first wind turbine 31, the second wind turbine 36 and the thermal receptors subsystem 44, and selectively delivering electricity to an electric load 16, a non-fossil fuel production subsystem 17; and/or the power grid 18.

Figure 23:
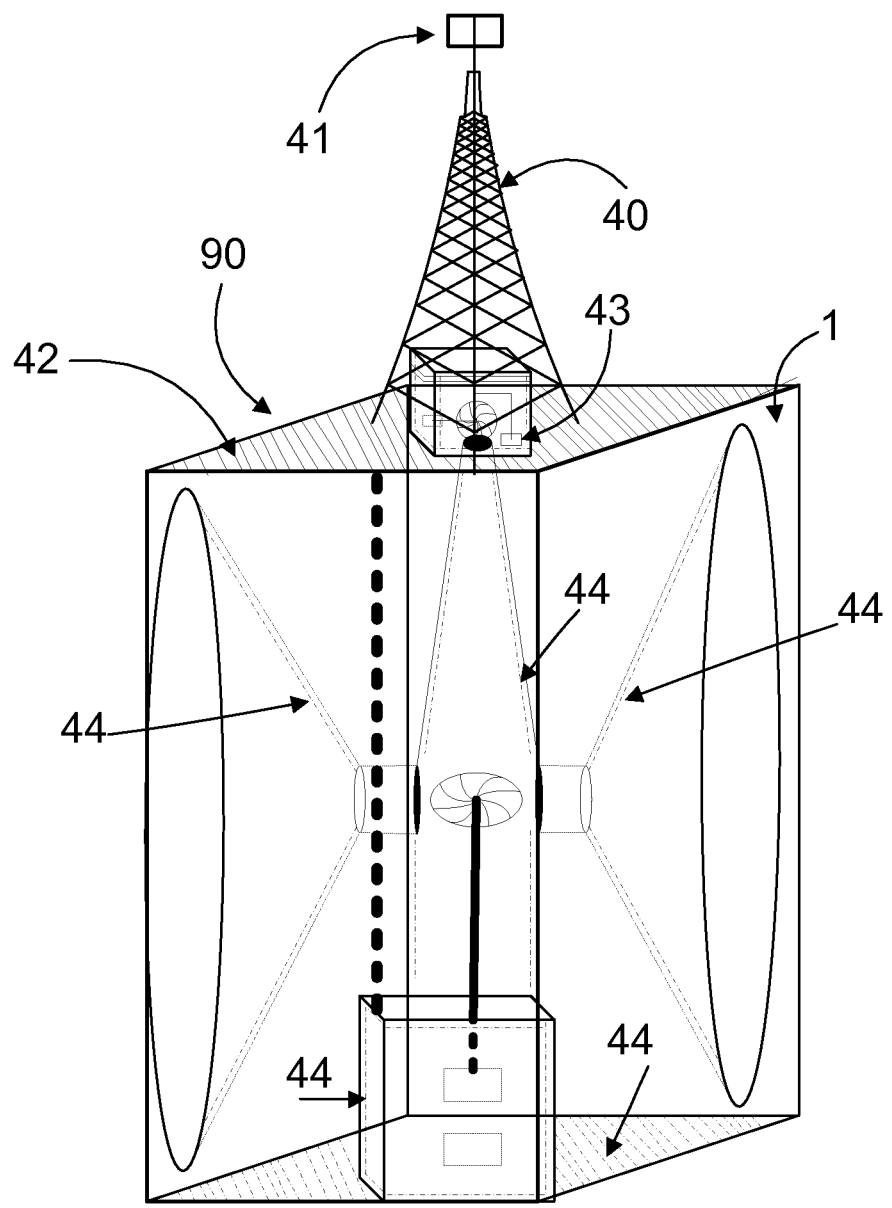
FIG. 23 shows a power tower system illustrating the invention in its simplest form, in accordance with another embodiment of the invention.

FIG. 23 shows a two wind turbine with solar power tower and thermal receptors power tower system 90 illustrating the invention in its simplest form, in accordance with another embodiment of the invention. The power tower 90 utilizes a solar power tower 40 provided at the center of the top portion of said building structure 1; a liquid furnace 41 placed on said solar tower; a plurality of sun-light tracking devices 42, such as heliostats or solid-state sun tracker, provided at the top portion of said building structure to focus the sun's ray upon said liquid furnace, and a steam-driven turbine 43 to convert steam energy to electricity; wherein the liquid furnace converts water to steam and said steam drives the steam-driven turbine 43 to generate electricity. The power tower 90 also utilizes thermal receptor subsystem 44 to convert thermal energy to electricity and solar tower subsystem 40 in addition to the first wind turbine 31 and the second wind turbine 36. The thermal receptors subsystem 44 are placed on any possible surface including the bottom portion 21 of the building structure 1, inside the first room 29 and the second room 30 and around the horizontal funnel-shaped ducts 27 and the vertical funnel-shaped duct 26 to harness thermal energy. Wherein the thermal receptors subsystem 44 includes a plurality of at least one of thermoelectric cells, concentrated thermoelectric cells, thermophotovoltaic cells, and concentrated thermophotovoltaic cells. The management control subsystem 19 combines electricity from the first wind turbine 31, the second wind turbine 36, the thermal receptors subsystem 44, and the steam-driven turbine 43 and selectively delivering electricity to an electric load 16, a non-fossil fuel production subsystem 17; and/or the power grid 18.

While there have been described above the principles of this invention in connection with specific apparatus, it is to be clearly understood that this description is made only by way of example and not as a limitation to the scope of the invention. Therefore, it should be apparent that the foregoing relates only to the preferred embodiments of the present invention and that numerous changes and modifications may be made herein without departing from the spirit and the scope of the invention as defined by the following claims and equivalents thereof.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus the scope of the invention should be determined by the appended claims and their legal equivalents, rather than by the examples given.

I claim:

1. A power plant system to generate electricity, said power plant system comprising:
   at least one power tower building structure having a top portion, a bottom portion, an outside surface, a hollow center portion, said hollow center portion connects the top portion with the bottom portion, a first room placed at the bottom portion of said building structure, a second room placed at the top portion of said building structure, and a conduit subsystem connects the top portion and the bottom portion of said building structure;
   a wind collection and accelerating subsystem;
   a wind receptor subsystem;
   a management control subsystem;
   wherein the wind receptors subsystem converts wind energy to electricity using wind receptors;
   said wind receptors subsystem comprising: a first wind turbine provided at the bottom portion of the building structure and a second wind turbine provided at the top portion of the building structure and housed in the said second room;
   said first wind turbine body is placed in the said first room and the first wind turbine blades are placed at the hollow portion of said building structure, wherein a horizontal barrier is provided around the shaft of the first wind turbine to prevent winds flowing downward to the bottom portion of said building structure;
   wherein said outside surface of said building structure is divided to a plurality of sections around said outside surface of said building structure to capture winds from any compass direction;
   wherein said wind collection and accelerating subsystem consists of a plurality of funnel-shaped horizontal ducts, such that each horizontal duct is provided for each said section of said outside surface of said building structure, whereby the cross sectional area of each horizontal duct decreases from the said outside surface of said building structure to a point before entry to the blades of the first wind turbine;
   wherein each said funnel-shaped duct provided with valve and control subsystem to prevent wind flowing backward and to control wind flow for high efficiency and to direct winds to the blades of said wind turbine;
   wherein said hollow center portion of said building structure forms a funnel-shaped vertical duct from a point above the blades of the first wind turbine to the top portion of said building structure, whereby the cross sectional area decreases from the said point above the blades of the first wind turbine to a point before entry to the blades of the second wind turbine, whereby the said vertical duct is provided with a control unit to control wind flow for high efficiency and to direct winds to the blades of the second wind turbine and a valve to prevent winds from flowing downward into the hollow center portion of said building structure;
   wherein said second room provided with vents to allow air flow outside said second room;
   wherein said conduit subsystem houses a plurality of at least one of wires, cables, and pipes, to transfer energy from the top portion to the lower portion of said building structure;
   wherein said funnel-shaped ducts provided with valve and control subsystem to prevent wind flowing backward and to control wind flow for high efficiency and to direct winds to the blades of said wind turbine;
   wherein the cross-sectional area of said funnel-shaped ducts includes a plurality of at least one of rectangular profile, circular profile, elliptical profile, polygonal profile, and irregular profile;
   wherein said power tower building structure includes a plurality of at least one of rectangular building, trapezoidal building, cubical building, spherical building, oval building, semi-oval building, cylindrical building, polygonal building, triangular building, semispherical building, cone building, semi-cone building, building with extended roof, building with wind huggers, and irregular shape building; and wherein said management control subsystem combines electricity from said first wind turbine and said second wind turbine, and selectively delivering electricity to a power grid and an electric load.

2. The power plant system as claimed in claim 1, further comprising: a non-fossil fuel production subsystem;

wherein said management control subsystem selectively delivers electricity to said non-fossil fuel production subsystem, said power grid, and said electric load; and wherein said non-fossil fuel production subsystem includes a plurality of at least one of hydrogen production subsystem, compressed air production subsystem, liquid nitrogen production subsystem, rechargeable batteries subsystem, and ammonia production subsystem.

3. The power plant system as claimed in claim 1, further comprising: solar receptor subsystem;

wherein said solar receptor subsystem converts solar power to electricity using solar receptors, said solar receptors are located on the top portion of said building structure;

wherein said solar receptor subsystem includes a plurality of at least one of photovoltaic cells, concentrated photovoltaic cells, dye solar cells, concentrated dye solar cells, thin-film solar cells, concentrated thin-film cells, three-layer photovoltaic cells, concentrated three-layer photovoltaic cells, luminescent photovoltaic cells, concentrated luminescent photovoltaic cells, polymer photovoltaic cells, concentrated polymer photovoltaic cells, hybrid solar cells, and concentrated hybrid solar cells; and wherein said management control subsystem combines electricity from said first wind turbine, said second wind turbine and said solar receptor subsystem, and selectively delivering electricity to said power grid and said electric load.

4. The power plant system as claimed in claim 3, further comprising: a non-fossil fuel production subsystem;

wherein said management control subsystem selectively delivers electricity to said non-fossil fuel production subsystem, said power grid, and said electric load; and wherein said non-fossil fuel production subsystem includes a plurality of at least one of hydrogen production subsystem, compressed air production subsystem, liquid nitrogen production subsystem, rechargeable batteries subsystem, and ammonia production subsystem.

5. The power plant system as claimed in claim 1, further comprising: a solar power tower provided at the center of the top portion of said building structure; a liquid furnace placed on said solar tower; a plurality of sun-light tracking devices provided at the top portion of said building structure to focus the sun's ray upon said liquid furnace, and a steam-driven turbine to convert steam energy to electricity;

wherein said liquid furnace converts water to steam and said steam drives the said steam-driven turbine to generate electricity; and wherein said management control subsystem combines electricity from said first wind turbine, said second wind turbine and said steam-driven turbine, and selectively delivering electricity to said power grid and said electric load.

6. The power plant system as claimed in claim 5, further comprising: a non-fossil fuel production subsystem;

wherein said management control subsystem selectively delivers electricity to said non-fossil fuel production subsystem, said power grid, and said electric load; and wherein said non-fossil fuel production subsystem includes a plurality of at least one of hydrogen production subsystem, compressed air production subsystem, liquid nitrogen production subsystem, rechargeable batteries subsystem, and ammonia production subsystem.

7. The power plant system as claimed in claim 1, further comprising: thermal receptor subsystem;

wherein said thermal receptor subsystem converts thermal power to electricity using thermal receptors, said thermal receptors acting as a heat sink are mounted on at least one of the said top portion of said building structure; said bottom portion, said outside surface, and the said room;

wherein said thermal receptors includes a plurality of at least one of thermoelectric cells, concentrated thermoelectric cells, thermophotovoltaic cells, and concentrated thermophotovoltaic cells; and wherein said management control subsystem combines electricity from said first wind turbine, said second wind turbine, said thermal receptor subsystem, and selectively delivering electricity to said power grid and said electric load.

8. The power plant system as claimed in claim 2, further comprising: thermal receptor subsystem;

wherein said thermal receptor subsystem converts thermal power to electricity using thermal receptors, said thermal receptors acting as a heat sink are mounted on at least one of the said top portion of said building structure; said bottom portion, said outside surface, said first room, and the said second room;

wherein said thermal receptors includes a plurality of at least one of thermoelectric cells, concentrated thermoelectric cells, thermophotovoltaic cells, and concentrated thermophotovoltaic cells; and wherein said management control subsystem combines electricity from said first wind turbine, said second wind turbine, said thermal receptor subsystem, and selectively delivering electricity to said non-fossil production subsystem, said power grid, and said electric load.

9. The power plant system as claimed in claim 3, further comprising: thermal receptor subsystem;

wherein said thermal receptor subsystem converts thermal power to electricity using thermal receptors, said thermal receptors acting as a heat sink are mounted on at least one of the said top portion of said building structure; said bottom portion, said outside surface, said first room, and the said second room;

wherein said thermal receptors includes a plurality of at least one of thermoelectric cells, concentrated thermoelectric cells, thermophotovoltaic cells, and concentrated thermophotovoltaic cells; and wherein said management control subsystem combines electricity from said first wind turbine, said second wind turbine, said solar receptor subsystem, and said thermal receptor subsystem, and selectively delivering electricity to said power grid and said electric load.

10. The power plant system as claimed in claim 4, further comprising: thermal receptor subsystem;

wherein said thermal receptor subsystem converts thermal power to electricity using thermal receptors, said thermal receptors acting as a heat sink are mounted on at least one of the said top portion of said building structure; said bottom portion, said outside surface, said first room, and the said second room;

wherein said thermal receptors includes a plurality of at least one of thermoelectric cells, concentrated thermoelectric cells, thermophotovoltaic cells, and concentrated thermophotovoltaic cells; and wherein said management control subsystem combines electricity from said first wind turbine, said second wind turbine, said solar receptor subsystem, and said thermal receptor subsystem, and selectively delivering electricity to said non-fossil fuel production subsystem, said power grid, and said electric load.

11. The power plant system as claimed in claim 5, further comprising: thermal receptor subsystem;

wherein said thermal receptor subsystem converts thermal power to electricity using thermal receptors, said thermal receptors acting as a heat sink are mounted on at least one of the said top portion of said building structure; said bottom portion, said outside surface, said first room, and the said second room;

wherein said thermal receptors includes a plurality of at least one of thermoelectric cells, concentrated thermoelectric cells, thermophotovoltaic cells, and concentrated thermophotovoltaic cells; and wherein said management control subsystem combines electricity from said first wind turbine, said second wind turbine, said steam-driven turbine, and said thermal receptor subsystem, and selectively delivering electricity to said power grid and said electric load.

12. The power plant system as claimed in claim 6, further comprising: thermal receptor subsystem;

wherein said thermal receptor subsystem converts thermal power to electricity using thermal receptors, said thermal receptors acting as a heat sink are mounted on at least one of the said top portion of said building structure, said bottom portion, said outside surface, said first room, and the said second room;

wherein said thermal receptors includes a plurality of at least one of thermoelectric cells, concentrated thermoelectric cells, thermophotovoltaic cells, and concentrated thermophotovoltaic cells; and wherein said management control subsystem combines electricity from said first wind turbine, said second wind turbine, said steam-driven turbine, and said thermal receptor subsystem, and selectively delivering electricity to said non-fossil fuel production subsystem, said power grid, and said electric load.

\* \* \* \* \*